United States Patent Office 3,114,740
Patented Dec. 17, 1963

3,114,740
POLYMERIZATION OF METHYL METHACRYLATE USING CATALYST COMBINATION OF TRIALKYL ALUMINUM AND PYROMELLITOCYANINE
Edward L. Kropa, Columbus, Ohio, assignor, by mesne assignments, to W. R. Grace & Co., New York, N.Y., a corporation of Connecticut
No Drawing. Filed Aug. 25, 1961, Ser. No. 133,767
3 Claims. (Cl. 260—89.5)

This invention is concerned with the polymerization of esters of alkacrylic acids. More particularly, this invention is directed to an improvement in the polymerization of methyl methacrylate.

It is known that methyl methacrylate can be polymerized in the presence of aluminum triethyl in a non-polar solvent such as toluene at 0° C. See Belgian Patent 566,-713. Although the resulting polymer obtained by this method is crystalline and has a melting point in excess of 100° C., the polymerization rate of the system is slow, thereby necessitating long polymerization periods which detract from the system's commercial acceptability.

Surprisingly, it has now been found possible to increase the polymerization rate and still obtain an acetone-insoluble methyl methacrylate polymer with a melting point above 135° C. by subjecting methyl methacrylate monomer in an inert solvent to the action of a catalyst consisting essentially of an aluminum trialkyl and pyromellitocyanine. Pyromellitocyanine is a polymeric metal free phthalocyanine prepared as described in Example 4 hereinafter. The terms are used interchangeably herein. The catalyst system of the instant invention gives a polymerization rate (gms. polymer/gms. catalyst/hour) in excess of that obtained by either of the catalyst components per se as will be shown hereinafter.

The reason for the increased polymerization rate is not known. However, the catalyst components when combined have a synergistic effect resulting in an increased polymerization rate.

Summarily this invention relates a method of increasing the polymerization rate of acetone-insoluble polymethylmethacrylate with a melting point above 135° C., by subjecting a monomer of the aforesaid polymer in an inert solvent (e.g. n-heptane) at a temperature in the range minus 40 to plus 100° C. to the action of a catalyst consisting essentially of pyromellitocyanine and aluminum trialkyl.

The following examples will more clearly explain this invention but are not to be deemed as limiting its scope.

In performing the instant invention the reaction is carried out under a blanket of an inert atmosphere to insure that the catalyst does not react with oxygen, moisture, or other contaminants. In the examples stated herein, pure dry lamp-grade nitrogen is used as the inert atmosphere. However, the noble gases, especially argon and helium are equally suitable.

Example 1

A 500 ml. round bottom flask fitted with stirrer, condenser, thermometer, nitrogen inlet and neoprene diaphragm for admission of hypodermic needles was charged in a nitrogen dry box with 50 ml. n-heptane and 0.52 gm. pyromellitocyanine (0.001 mole). The flask was removed from the dry box, its contents agitated and put under a nitrogen blanket through the inlet tube. Heat was applied to maintain a temperature of 68° C. in the flask. A hypodermic charge of triethyl aluminum (0.003 mole in 2 cc. n-heptane) was added through the neoprene diaphragm with agitation. The suspended pyromellitocyanine changed from a blue-green to a green color, at which time 0.3 mole of methyl methacrylate monomer was added to the flask and the temperature was increased to 85° C. After a 5 hour reaction period with agitation at 85° C., the flask and contents were cooled and 100 ml. methyl alcohol was added to the flask to decompose the catalyst. The solid methyl methacrylate polymer was filtered, ground in a Waring Blendor with additional methyl alcohol, and dried. The dried solid polymer product was refluxed for 1 hour with 50 ml. acetone, cooled to room temperature and filtered. The dried acetone-insoluble polymer product weighed 16.3 grams and had a melting point in the range 135–150° C. This melting point range is characteristic of polymethylmethacrylate, which is more crystalline and more stereospecific than polymer prepared by radical initiation. The polymerization rate $$\left(\frac{16.3 \text{ g. polymer}}{0.862 \text{ g. catalyst} \times 5 \text{ hrs.}}\right)$$

of the acetone-insoluble polymer product was 3.79. The acetone-soluble polymer product was precipitated from solution with methyl alcohol filtered and dried overnight in a vacuum oven. The dried acetone-soluble polymer product weighed 5.8 grams and had a melting point in the range 135–145° C. The overall polymerization rate of the system was 5.13.

To more clearly point out the increase in polymerization rate for an acetone-insoluble polymer obtained by the instant invention over a system wherein only one catalyst component was used as taught by prior art, the following runs were made.

Example 2

The equipment and procedure were the same as in Example 1, except that the catalyst consisted of 0.006 mole of triethyl aluminum per se. 0.29 mole of methyl methacrylate monomer were charged to the flask and the reaction was heated from 70° C. to 85° C. After a 5 hour run with agitation, the polymerization reaction was discontinued and the solid methyl methacrylate polymer product was separated into acetone-soluble and insoluble portions as in Example 1. The dried acetone-insoluble portion weighed 2.2 grams and melted at 135°–145° C. The polymerization rate for the acetone-insoluble polymer product was 0.65. The overall polymerization rate for the system was 3.72.

Example 3

The equipment and procedure were the same as in Example 1 except that the catalyst consisted of 0.002 mole of pyromellitocyanine per se. After charging 0.29 mole of methyl methacrylate monomer and heating from 70° C. to 85° C. the reaction was continued for 8 hours. No solid methyl methacrylate polymer product was obtained.

A comparison of Examples 1 and 2 shows that a greater than 500% increase in polymerization rate of producing acetone-insoluble polymethylmethacrylate is obtained by the practice of the invention as compared to the teaching of the prior art. Since Example 3 yielded no polymer, no comparison of the improvement in polymerization rate can be made therewith.

Although the aluminum trialkyl used in all the examples was aluminum triethyl, tri(lower) alkyls in general are operative in combination with pyromellitocyanine in the instant invention. By lower aluminum trialkyl is meant aluminum trialkyls having 1–8 carbon atoms in the alkyl groups.

Polymerization is preferably performed in the presence of a solvent. The solvent used in the practice of this invention should be one which is inert and does not interact with either the monomer to be polymerized, the catalyst, or the growing polymer chain. The preferred inert solvents are dry aliphatic hydrocarbon solvents in the alkane and cycloalkane groups. Examples of some preferred solvents include n-pentane, n-hexane, n-heptane, n-octane, n-nonane, and cyclohexane.

The reaction may be performed within a broad range of temperatures. Since the polymerization rate varies greatly with temperature, it is preferable to use as high a temperature as possible whereat an acetone-insoluble polymer may still be obtained. A temperature range of —40 to 100° C. is operable; preferably, a temperature in the range 70 to 85° C. is employed.

The polymerization reaction is carried out at atmospheric pressure. Higher or lower pressures are operable but are unnecessary.

The following example shows the preparation of the polymeric metal free phthalocyanine used herein as a catalyst.

Example 4

To a 250 ml. beaker containing an excess of boiling sodium amylate was charged 0.7325 gm. of pyromellitic tetranitrile i.e.

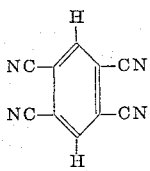

The reaction was instantaneous to form lumps of blue-black material in a dark green-blue solution. The reaction mixture was boiled for one hour prior to the addition of 30 ml. of benzyl alcohol and 1 gm. of ammonium sulfate. Boiling was continued for ½ hour and the reaction discontinued. The mixture was cooled, diluted with ethanol and water until the washings were clear. The resultant dried solid polymeric metal free phthalocyanine also referred to herein as pyromellitocyanine weighed 0.6879 gm.

The amount of catalyst is not critical. Relatively small amounts are operable to form relatively large amounts of polymer. In general, a practical range is 0.001 to 0.1 mole catalyst per mole monomer to be polymerized. Even larger amounts of catalyst are operable but sometimes present a purification problem.

The ratio of the pyromellitocyanine to aluminum trialkyl is not critical. Molar ratios of pyromellitocyanine: aluminum trialkyl of 1:1 to 10 are operative; the preferred range is respectively 1:2 to 3.

The acetone-insoluble methyl methacrylate polymer produced by the present invention can be used in the same manner and means as the methyl methacrylate polymer formed by the prior art. Such uses include molded and extruded articles of commerce, e.g., signs, automotive ornaments, instrument panel parts, reflectors, and the like.

I claim:

1. The process of polymerizing methyl methacrylate which comprises in an inert atmosphere subjecting methyl methacrylate monomer at a temperature in the range minus 40 to plus 100° C. to the action of a catalyst consisting essentially of a pyromellitocyanine and aluminum trialkyl containing 1–8 carbon atoms in the alkyl groups.

2. Process according to claim 1 wherein the mole ratio of pyromellitocyanine to aluminum trialkyl is in the range of 1:1 to 10 respectively.

3. The process of obtaining an acetone-insoluble polymer of methyl methacrylate having a melting point in the range 135–150° C. which comprises in an inert atmosphere contacting methyl methacrylate monomer at a temperature in the range minus 40 to plus 100° C. in an n-heptane solvent with a catalyst consisting essentially of pyromellitocyanine and aluminum triethyl, the mole ratio of said catalyst components being in the range 1:1 to 10 respectively and the mole ratio of methyl methacrylate monomer to catalyst in the range 1:0.001 to 0.1 respectively.

References Cited in the file of this patent

UNITED STATES PATENTS

| | | |
|---|---|---|
| 2,234,076 | Gumlich et al. | Mar. 4, 1941 |
| 2,980,833 | Epstein | Apr. 18, 1961 |

FOREIGN PATENTS

| | | |
|---|---|---|
| 566,713 | Belgium | Apr. 30, 1958 |

OTHER REFERENCES

Cook: Chem. Abs., volume 33, 1939, page 1328$^9$.

Korsunovskii: Chem. Abs., volume 53, 1959, page 3901b.

Lubs: Chemistry of Synthetic Dyes and Pigments, Waverly Press, Inc., Baltimore, Maryland, 1955, pages 580–583.